US011459121B2

(12) United States Patent
Lee et al.

(10) Patent No.: US 11,459,121 B2
(45) Date of Patent: Oct. 4, 2022

(54) GLOBAL PLANE IDENTIFICATION NUMBER GENERATION AND APPLICATIONS

(71) Applicant: Panasonic Avionics Corporation, Lake Forest, CA (US)

(72) Inventors: Jae Keon Lee, Buena Park, CA (US); Robert Connor Gleason, Foothill Ranch, CA (US); Jon Evan Saltzman, San Clemente, CA (US)

(73) Assignee: PANASONIC AVIONICS CORPORATION, Irvine, CA (US)

(*) Notice: Subject to any disclaimer, the term of this patent is extended or adjusted under 35 U.S.C. 154(b) by 626 days.

(21) Appl. No.: 16/439,698

(22) Filed: Jun. 12, 2019

(65) Prior Publication Data

US 2020/0391883 A1    Dec. 17, 2020

(51) Int. Cl.
| | | |
|---|---|---|
| *B64F 5/00* | (2017.01) | |
| *G06Q 50/04* | (2012.01) | |
| *G08G 5/00* | (2006.01) | |
| *B60R 25/33* | (2013.01) | |
| *G08G 1/00* | (2006.01) | |
| *G06Q 10/08* | (2012.01) | |

(52) U.S. Cl.
CPC ............... *B64F 5/00* (2013.01); *B60R 25/33* (2013.01); *G06Q 10/0875* (2013.01); *G06Q 50/04* (2013.01); *G08G 1/20* (2013.01); *G08G 5/0013* (2013.01); *G08G 5/0021* (2013.01); *G08G 5/0026* (2013.01)

(58) Field of Classification Search
CPC ....... B64F 5/00; B60R 25/33; G06Q 10/0875; G06Q 50/04; G08G 1/20; G08G 5/0013; G08G 5/0021; G08G 5/0026
See application file for complete search history.

(56) References Cited

U.S. PATENT DOCUMENTS

| | | | | |
|---|---|---|---|---|
| 6,338,045 B1 * | 1/2002 | Pappas | ................ | G06Q 10/06 705/29 |
| 7,360,701 B2 * | 4/2008 | Sagnak | ................ | G06Q 10/20 235/385 |
| 2002/0169746 A1 * | 11/2002 | Cowman | ................ | G06F 16/93 |

(Continued)

FOREIGN PATENT DOCUMENTS

| | | |
|---|---|---|
| CN | 107342898 | 11/2017 |
| CN | 108846568 | 11/2018 |

*Primary Examiner* — Ramsey Refai
(74) *Attorney, Agent, or Firm* — Perkins Coie LLP

(57) ABSTRACT

Disclosed are devices, systems and methods for global plane identification number (GPIN) generation and applications are disclosed. Embodiments of the disclosed technology advantageously enable aircraft to be tracked throughout their service life, and associate parts, software and services that correspond to a particular aircraft. An exemplary method for identifying an aircraft includes generating, based on a manufacturer, a model and a series of the aircraft, an alphanumeric prefix that uniquely identifies the model and the series of the aircraft from the manufacturer; generating, from a manufacturer serial number that is assigned to an airframe of the aircraft, a modified serial number; and generating, based on concatenating the alphanumeric prefix and the modified serial number, an identification number for the aircraft.

20 Claims, 6 Drawing Sheets

(56) References Cited

U.S. PATENT DOCUMENTS

| | | |
|---|---|---|
| 2005/0055239 A1 | 3/2005 | Farmer |
| 2006/0097057 A1* | 5/2006 | Porad .................. H01Q 1/2225 |
| | | 235/492 |
| 2007/0114280 A1* | 5/2007 | Coop ..................... G06Q 50/30 |
| | | 235/385 |
| 2008/0073432 A1* | 3/2008 | Barenburg ............ G06Q 10/08 |
| | | 235/385 |
| 2009/0138516 A1 | 5/2009 | Young et al. |
| 2017/0116684 A1* | 4/2017 | Corrigan ................ G06Q 50/04 |
| 2017/0278410 A1 | 9/2017 | Byers et al. |
| 2018/0350246 A1 | 12/2018 | Burgess et al. |

* cited by examiner

| OEM Name (AC Make) | AC Model/Series | GPIN Prefix | OEM Name (AC Make) | AC Model/Series | GPIN Prefix |
|---|---|---|---|---|---|
| Airbus | A220-100 | A221 | Boeing | 737-900ER | B739 |
| Airbus | A220-300 | A223 | Boeing | 737 Max 7 | B37M |
| Airbus | A300B4 | A30B | Boeing | 737 Max 8 | B38M |
| Airbus | A300-600 | A306 | Boeing | 737 Max 9 | B39M |
| Airbus | A310-200 | A310 | Boeing | 747-100 | B741 |
| Airbus | A310-300 | A310 | Boeing | 747-200 | B742 |
| Airbus | A318 | A318 | Boeing | 747-300 | B743 |
| Airbus | A319 | A319 | Boeing | 747-400 | B744 |
| Airbus | A319neo | A19N | Boeing | 747-8I | B748 |
| Airbus | A320 | A320 | Boeing | 747SP | B74S |
| Airbus | A320neo | A20N | Boeing | 757-200 | B752 |
| Airbus | A321 | A321 | Boeing | 757-300 | B753 |
| Airbus | A321neo | A21N | Boeing | 767-200 | B762 |
| Airbus | A330-200 | A332 | Boeing | 767-300 | B763 |
| Airbus | A330-300 | A333 | Boeing | 767-400 | B764 |
| Airbus | A330-500 | A335 | Boeing | 777-200 | B772 |
| Airbus | A330-700 | A337 | Boeing | 777-200LR | B77L |
| Airbus | A330-800 | A338 | Boeing | 777-300 | B773 |
| Airbus | A330-900 | A339 | Boeing | 777-300ER | B77W |
| Airbus | A340-200 | A342 | Boeing | 777-8 | B778 |
| Airbus | A340-300 | A343 | Boeing | 777-9 | B779 |
| Airbus | A340-500 | A345 | Boeing | 787-3 | B783 |
| Airbus | A340-600 | A346 | Boeing | 787-8 | B788 |
| Airbus | A350-900 | A359 | Boeing | 787-9 | B789 |
| Airbus | A350-1000 | A35K | Boeing | 787-10 | B78X |
| Airbus | A380-800 | A388 | Bombardier | DHC-8-400 (Q400) | DH8D |
| Boeing | 707-100 | B701 | COMAC | ARJ21 | AJ27 |
| Boeing | 707-300 | B703 | COMAC | C919 | C919 |
| Boeing | 717-200 | B712 | Embraer | E170 | E170 |
| Boeing | 720 | B720 | Embraer | ERJ190 | E190 |
| Boeing | 727-100 | B721 | Embraer | ERJ195 | E195 |
| Boeing | 727-200 | B722 | Embraer | ERJ145 | E145 |
| Boeing | 737-200 | B732 | McDonnell Douglas | DC-10 | DC10 |
| Boeing | 737-300 | B733 | McDonnell Douglas | DC-8 | DC8 |
| Boeing | 737-400 | B734 | McDonnell Douglas | DC-9 | DC9 |
| Boeing | 737-500 | B735 | McDonnell Douglas | MD-11 | MD11 |
| Boeing | 737-600 | B736 | McDonnell Douglas | MD-80 | MD80 |
| Boeing | 737-700 | B737 | McDonnell Douglas | MD-90 | MD90 |
| Boeing | 737-800 | B738 | Mitsubishi | MU2 | MU2 |
| Boeing | 737-900 | B739 | SAAB | SAAB-2000 | SB20 |

FIG. 2

GLOBAL PLANE IDENTIFICATION NUMBER GENERATION AND APPLICATIONS

TECHNICAL FIELD

This document is directed generally to the aviation industry, and in particular, to aircraft identification.

BACKGROUND

The tracking of aircraft is an activity performed by airports, airlines, governmental agencies (e.g., Federal Aviation Administration (FAA)), maintenance operators and logistics companies to ensure an aircraft maintains its airworthiness. However, existing aircraft identification frameworks are unable to track an aircraft through its entire lifecycle, from production to retirement, which may span several decades and may go through several ownership changes.

SUMMARY

Embodiments of the disclosed technology generate a Global Plane Identification Number (GPIN) to advantageously enable an aircraft to be identified and tracked through its entire lifecycle, which may span several decades. In an example, the GPIN is generated based on the aircraft make, model, series, and manufacturing metadata.

In one exemplary aspect, a computer-implemented method for identifying an aircraft is disclosed. The computer-implemented method includes generating, based on a manufacturer, a model and a series of the aircraft, an alphanumeric prefix that uniquely identifies the model and the series of the aircraft from the manufacturer using a first computer-implemented technique; generating, from a manufacturer serial number that is assigned to an airframe of the aircraft, a modified serial number using a second computer-implemented technique; and generating, based on concatenating the alphanumeric prefix and the modified serial number, an identification number for the aircraft using a third computer-implemented technique.

In another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 2 shows an exemplary table that converts an aircraft make, model, and series by a particular manufacturer to a GPIN prefix, in accordance with embodiments of the disclosed technology.

DETAILED DESCRIPTION

Figures 1A, 1B:
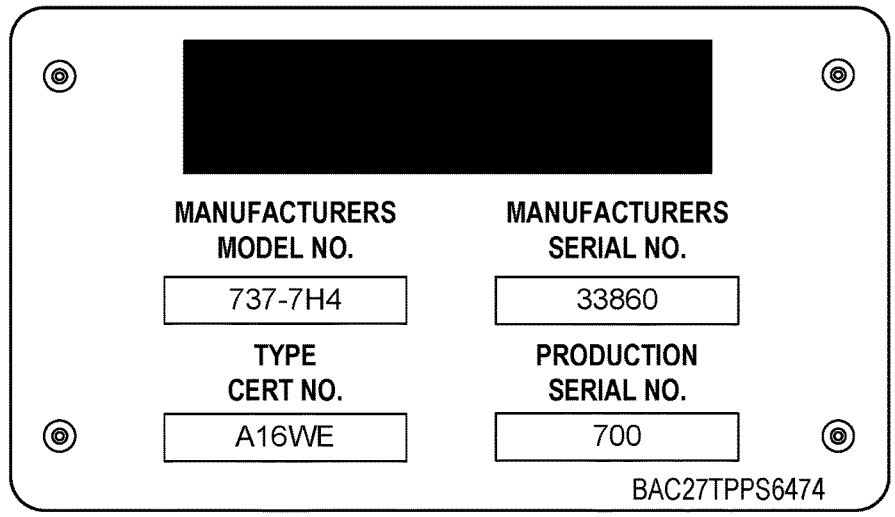
FIGS. 1A and 1B show examples of manufacturer serial number plates.

Globally, it is estimated that commercial aircraft operators spend nearly U.S. $400 billion per year on operating expenses. Aircraft operators are interested in operational efficiency, and are therefore continually looking for new technology that solves the technical limitations posed by existing technologies used in the operation. Such technologies hold the promise of minimizing the cost of fleet maintenance, vendor costs, fuel consumption, crew costs, airport fees and other costs, and to optimize the potential of using any means whereby overall operating expenses may be minimized.

Operating expenses continue over the lifecycle of an aircraft that can extend over decades. As the aircraft ages, parts on the aircraft are repaired or replaced. Through this lifecycle, the parts may become subject to design modification and revision. Aircraft operators, original equipment manufacturers (OEMs), maintenance, repair and overhaul (MRO) providers, and third parties (e.g., governmental agencies, third party suppliers, parts brokers, etc.) are all contributors in the lifecycle and maintenance of an aircraft. The ability to review a given part's origins and repair history, or a software's installation and update history, are critical to assuring the quality and safety of the aircraft.

Existing technologies for aircraft identification and tracking are unable to provide continuity from the production of the aircraft to its retirement, especially since aircraft operators, OEMs, MRO providers and third parties often use proprietary identification frameworks that cannot be transferred across entities and organizations. Embodiments of the technology described in this document provide a framework for aircraft identification that is intended to remain unchanged over the lifecycle of the aircraft, inclusive of aircraft ownership changes, registration number changes and aircraft equipment installations and re-configurations (including, but not limited to, hardware, software and services).

Section headings are used in the present document for ease of understanding and do not limit the embodiments and techniques to the corresponding sections. As such, embodiments from one section can be combined with embodiments from other sections.

Technical Limitations of Existing Implementations for Aircraft Identification

Several existing methods of aircraft identification are unable to provide continuity from the production of the aircraft to its retirement. Furthermore, these methods are typically tied to a specific functionality, use case or manufacturer, and subject to abandonment or change if the aircraft gets repurposed or overhauled in any significant manner.

The registration number is an official aircraft identification that is approved by an airworthiness authority (e.g., the National Aviation Authority (NAA) for each country). The registration number is unique for an aircraft in a particular jurisdiction, but can change over the lifetime of the aircraft. For example, the registration number of an aircraft can change when the aircraft changes ownership or jurisdiction of registration. For another example, the registration number can be re-used when an aircraft has been sold, destroyed or retired.

The tail number is similar to the registration number for civil aviation, and typically corresponds to a serial number for military aircraft. However, the tail number suffers from the same drawbacks as the registration number.

The manufacturer serial number (MSN) is assigned by the manufacturer upon production of the aircraft, but is not intended to be unique on its own. The MSN is typically unique, by aircraft type, for a majority of aircraft manufacturers (e.g., Boeing). However, some manufacturers reuse the same serial number across different types of aircraft (e.g., Airbus). In general, MSNs may be re-used across different types of airframes and numeric ranges may overlap across time and manufacturers, thereby negating its ability to serve as a unique identification number for every aircraft across its lifecycle.

The block and line number is an example of a proprietary numbering scheme used by Boeing, which may be unique, but is not available publicly.

The nose, fleet or ship number is an example of an internal number assigned by an airline (e.g., United Airlines), but is not consistently implemented across airlines.

The International Civil Aviation Organization (ICAO) 24-bit aircraft address is a unique address assigned to the transponder (e.g., a Mode S transponder) of an aircraft when the aircraft is assigned a registration number. Although the 24-bit aircraft address does not change, a transponder in an aircraft is reprogrammable and, occasionally, may be moved from one aircraft to another. Furthermore, the 24-bit aircraft address may be entered incorrectly into flight management systems. Additionally, not all aircraft are equipped with Mode S transponders (e.g., they may have Mode A or Mode C transponders).

Exemplary Embodiments of the Global Plane Identification Number (GPIN)

Embodiments of the disclosed technology provide a robust mechanism for aircraft identification denoted as a Global Plane Identification Number (GPIN), which is intended to remain unchanged over the lifecycle of the aircraft, inclusive of aircraft ownership changes, registration number changes and aircraft equipment (re-)configurations (including, but not limited to, hardware, software and services).

In some embodiments, the GPIN connects the physical aircraft (e.g., the airframe of the aircraft) to its hardware and software (re-)configurations throughout the life of the aircraft, which advantageously increases the efficacy of procurement services for aircraft parts and software, maintenance operations, and third-party operations for aviation providers.

In an example, applications may be developed for head-end line replaceable units (LRUs) to offer easier and simpler maintenance, service and troubleshooting by using a smart link between the aircraft and the GPIN server.

In another example, improvements in productivity and technical data accuracy can be realized by utilizing resources and data that are linked/connected using a GPIN.

In yet another example, data feeds and application programming interfaces (APIs) for the GPIN framework and functionality may be provided to third-party recipients across multiple industries (e.g., maintenance, repair and overhaul (MRO) services, parts brokers, component services programs (CSPs), marketing firms, global aircraft location services, etc.).

In yet another example, the GPIN can be integrated with location-aware services to improve the accuracy and reliability of aviation safety.

In yet another example, the GPIN can be used to consistently identify an aircraft throughout its lifecycle, even if it repurposed from a commercial aircraft to a freight carrier, which may include a change of ownership, jurisdiction and a number of parts/components to serve its new purpose, which would typically result in an existing aircraft identification being changed due to at least one of the aforementioned factors.

In some embodiments, a GPIN is generated based on a manufacturer serial number, examples of which are shown in FIGS. 1A and 1B, in conjunction an identifier that is created based on the GPIN prefix. FIG. 1A shows an example of an MSN plate for an aircraft manufactured by Boeing (with MSN 33860 and registration number N47OWN) and FIG. 1B shows another example of an Airbus-manufactured aircraft (with MSN 1394 and registration number DQ-FJT).

Basing the GPIN on the aircraft make, model, and/or series ensures that basic structural components of the aircraft (e.g., the airframe, wings and hub capacity) are incorporated into the identification. That is, the GPIN integrates the form, fit and function of the aircraft by using the aircraft make, model, and/or series, which includes an alphabetical prefix based on the manufacturer (e.g., original equipment manufacturer (OEM)), and as shown in Table 1.

TABLE 1

Manufacturer (OEM)-based alphabetical prefix for GPIN

| OEM Name | OEM ID |
| --- | --- |
| Airbus | A |
| ATR | AT |
| Boeing | B |
| McDonnell Douglas | DC or MD |
| Bombardier | DH |
| COMAC | C or AJ |
| Embraer | E |
| Mitsubishi | M |
| SAAB | S |

In some embodiments, the manufacturer-based alphabetical prefix is extended to a GPIN prefix to include the make, model, and/or series of the aircraft, as shown in FIG. 2. For example, the alphanumeric prefix for a 737 Max 8 aircraft manufactured by Boeing is B38M, whereas a A330-800 manufactured by Airbus is identified as A338. As shown in FIG. 2, the aircraft type prefix string distinguishes between an aircraft model (e.g., "777") and an aircraft series (e.g., "777-300"), and provides unique identifiers that cannot be generated by existing standards for aircraft identification (e.g., the ICAO 8643 Type Designator).

The GPIN prefixes shown in FIG. 2 were created to ensure that serial numbers within each prefix will not be duplicated. In an example, the alphanumeric prefix is calculated by combining a unique identifier representing the manufacturer (as shown in Table 1) and a GPIN prefix string generated by embodiments of the disclosed technology.

In some embodiments, the GPIN prefix is computed to ensure that serial numbers, when combined with the prefix and GPIN rules, result in a unique aircraft identifier. The GPIN prefix encodes information about aircraft type into a short alphanumeric string, at a sufficiently detailed level that makes it possible to distinguish an unique identity for every aircraft and/or airframe. The GPIN prefix is harmonized with industry standards to the extent possible (e.g., the ICAO 8643 type designator). The computation of the GPIN has been designed by aircraft industry experts through extensive research and testing to ensure uniqueness when employed in the GPIN numbering system.

The GPIN prefix string is capable of bridging the gap between old and new aircraft and numbering schemes, especially since the lifecycles of aircraft are typically measured in decades, and ensures that serial numbers do not overlap within the model and series of aircraft.

FIGS. 3A-3D show examples of generating a GPIN. In some embodiments, these examples are generated using the following procedure:

Step 1. The alphanumeric prefix is selected from the table shown in FIG. 2 based on the aircraft make, model, and/or series.

Step 2. The serial number (e.g., the MSN) is modified by removing any non-alphanumeric character. That is, the modified serial number only consists of uppercase or lowercase letters from the basic Latin alphabet (26 characters, A-Z or a-z) and numbers in the range 0-9. No spaces, special characters or other characters/symbols are used in the generation of the modified serial number. In an example, any preceding zeros in a MSN are maintained in the modified serial number when generating the GPIN.

Step 3. The GPIN prefix (generated in Step 1) and the modified serial number (generated in Step 2) are concatenated and separated by a dash "-". That is, the dash is placed directly after the alphanumeric prefix and directly before the modified serial number.

The aforementioned procedure ensures that a unique GPIN is generated for and assigned to a single aircraft, and which is intended to be maintained through the lifetime of the aircraft. However, in extremely rare cases or cases of human error, embodiments of the disclosed technology provide for the reassignment of a GPIN.

Figure 3A:
FIGS. 3A-3D show examples of generating a permanent GPIN.
Figure 3B:
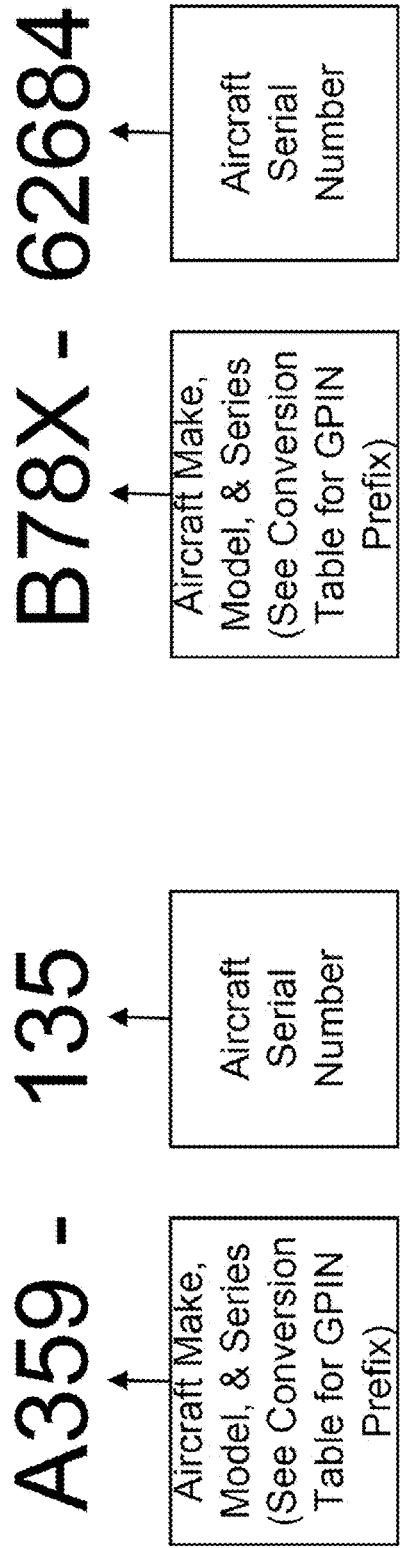
Figure 3C:
Figure 3D:
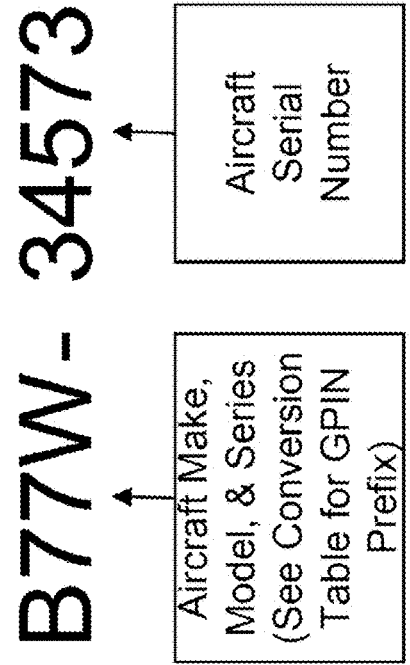

In the example shown in FIG. 3A, an A350-900 aircraft manufactured by Airbus that has been assigned a serial number "135" is assigned the GPIN "A359-135". Similarly, in the example shown in FIG. 3B, the GPIN "B78X-62684" identifies this aircraft as being a Boeing 787-10 with a serial number "62684".

Figure 4A:
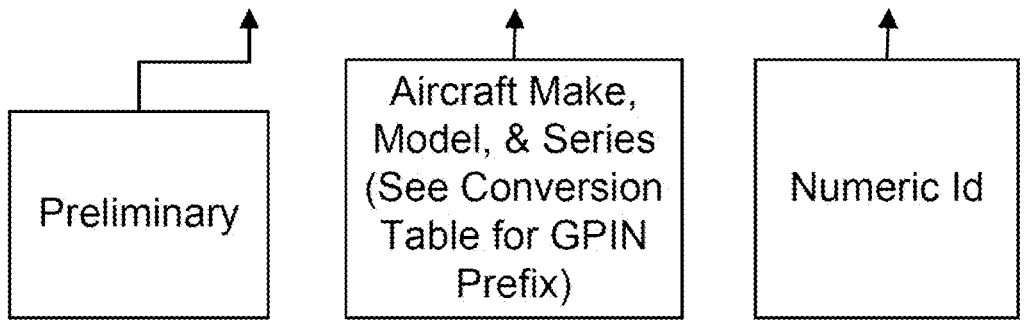
FIGS. 4A and 4B show examples of generating a temporary GPIN.
Figure 4B:
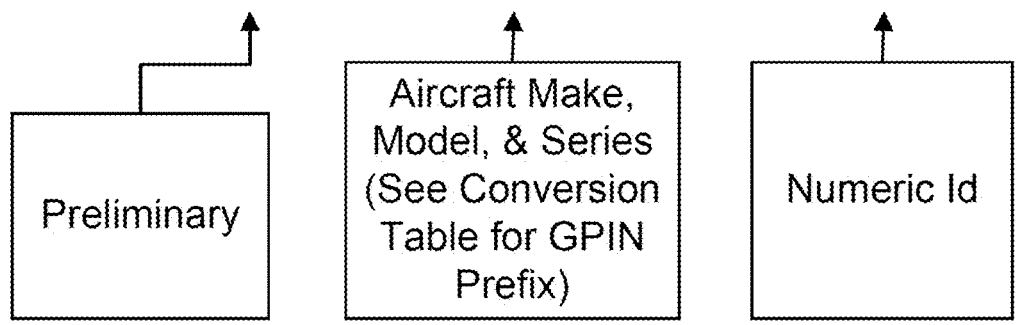

Embodiments of the disclosed technology also provide a GPIN for aircraft that are on order or forecast, and which is referred to as a preliminary GPIN. FIGS. 4A and 4B show examples of generating a temporary GPIN. In some embodiments, these examples are generated using the following procedure:

Step 1. The preliminary GPIN being with the letter "P" and a dash "-" to indicate that the GPIN is preliminary or temporary.

Step 2. The specialized alphanumeric prefix is selected from the table shown in FIG. 2 based on the aircraft make, model, and/or series.

Step 3. A unique integer (or numeric sequential identifier) is generated and associated with the GPIN being created, and is only ever generated once.

Step 4. The components generated in Steps 1-3 are concatenated to generate the preliminary GPIN.

In some embodiments, a new GPIN is generated for the newly manufactured aircraft, and the preliminary GPIN is linked to this new GPIN.

In the example shown in FIG. 4A, an A350-900 has been ordered from Airbus by an airline, and the preliminary GPIN assigned to it is "P-A359-12345", with the "P-" denoting that this is a temporary identification number, "A359" denoting that the aircraft in question is an Airbus A350-900, and "12345" being the unique integer generated for this aircraft, and never to be re-used again for another aircraft.

In some embodiments, and as discussed earlier, it may be necessary to reassign a GPIN. Embodiments of the disclosed technology can support a GPIN reassignment by the inclusion of the old and new GPINs on a GPIN conflict/exception list, which may be updated regularly. Users of the GPIN framework can update systems, processes and databases based on the most current GPIN conflict/exception list.

In an example, a "Serial Number Conflict" error may be issued to indicate that the same GPIN is being used by two or more aircraft. In another example, a "Serial Number Invalid" error may be issued to indicate that the serial number in the aircraft metadata is invalid, which resulted in the generated GPIN being incorrect. Both these errors are typically accompanied by the new/corrected GPIN in the GPIN conflict/exception list.

In some embodiments, the GPIN or preliminary GPIN may be suffixed with a check digit that advantageously ensures that the identification number was correctly entered into a system or database. In an example, the check digit is computed based on the ASCII code for any alphabets in the GPIN. In another example, the check digit may be a hexadecimal character that may be appended at the end of a GPIN or preliminary GPIN.

For example, the GPIN for an Boeing 737 Max 9 aircraft with serial number "1-7-3512" can be computed to be "B39M-173512". The ASCII codes for "B" and "M" are 66 and 77, respectively, and in an exemplary scenario, a purely numerical representation of the GPIN can be "66/39/77/173512" (wherein the "/" characters are included only to improve readability). In an example, the sum of this numerical representation is 57, and the corresponding hexadecimal check digit is computed as "9" (since 58% 16=9, where % is the modulo operator), and thus the GPIN can be transformed to "B39M-173512-9". In another example, the numerical representation "66/39/77/173512" modulo 16 (since the check digit is a hexadecimal character), i.e., 663977173512% 16=8, and thus the GPIN can be transformed to "B39M-173512-8". These examples merely serve to illustrate the computation of the check digit for the GPIN or preliminary GPIN, and can be performed using computer-implemented methods using variations of the described algorithms (e.g., different base for the check digits, etc.).

When the check digit is appended to the GPIN, as described in the examples above, parties exchanging data with GPIN may clearly indicate that a "GPIN with check digit" is being used, so as to differentiate it from the GPIN (without the check digit) being used.

Exemplary Methods for Aircraft Identification

Figure 5:
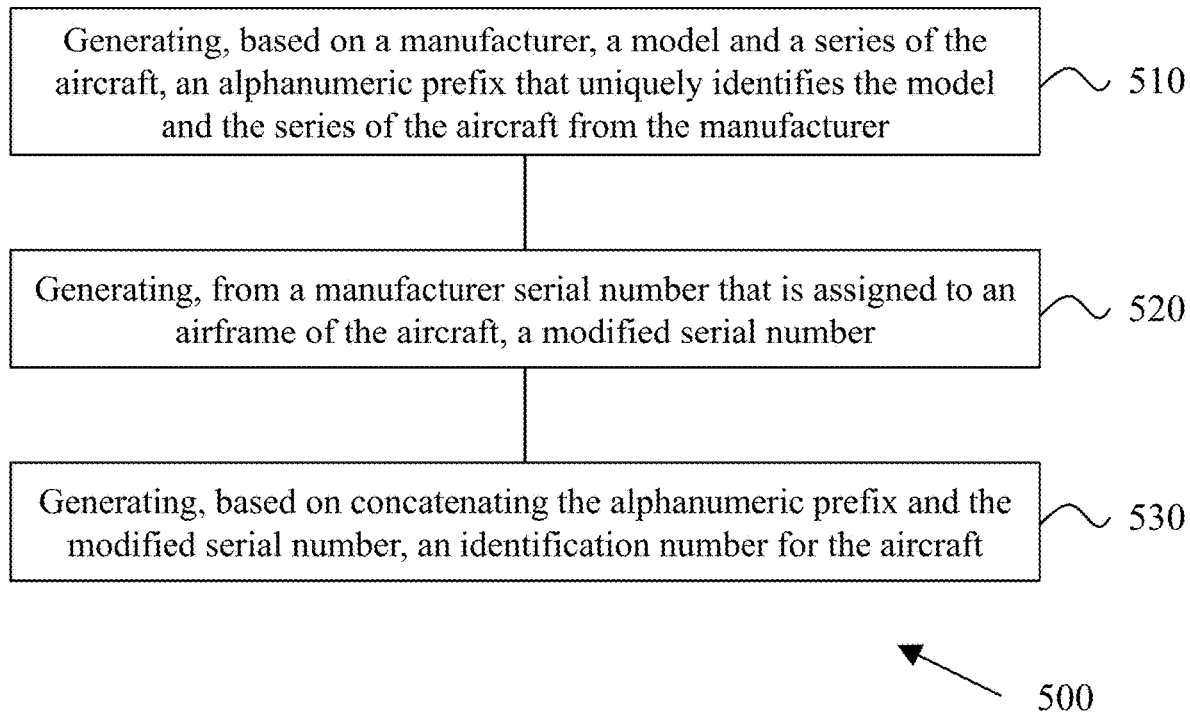
FIG. 5 shows a flowchart of an example method for aircraft identification, in accordance with embodiments of the disclosed technology.

FIG. 5 shows a flowchart of an example method 500 for aircraft identification, in accordance with embodiments of the disclosed technology. The method 500 includes, at step 510, generating, based on a manufacturer, a model and a series of the aircraft, an alphanumeric prefix that uniquely identifies the model and the series of the aircraft from the manufacturer. In some embodiments, the generating in step 510 is performed using a first computer-implemented technique.

The method 500 includes, at step 520, generating, from a manufacturer serial number that is assigned to an airframe of the aircraft, a modified serial number. In some embodiments, the generating in step 520 is performed using a second computer-implemented technique.

The method 500 includes, at step 530, generating, based on concatenating the alphanumeric prefix and the modified serial number, an identification number for the aircraft. In some embodiments, the generating in step 530 is performed using a third computer-implemented technique.

In some embodiments, the identification number is associated with the airframe of the aircraft and remains unchanged and unique over a service life of the aircraft.

In some embodiments, the second computer-implemented technique comprises generating the modified serial number by parsing the manufacturer serial number and removing non-alphanumeric characters from the manufacturer serial number.

In some embodiments, the method 500 further includes the step of associating, using the identification number, the airframe of the aircraft with at least one software installed on the aircraft. In other embodiments, the method 500 further includes the step of associating, using the identification number, the airframe of the aircraft with at least one hardware component installed on the aircraft.

In some embodiments, the method 500 further includes the step of adding a prefix "P" to the concatenation of the alphanumeric prefix and the modified serial number to indicate that a manufacture of the aircraft has not been completed.

In some embodiments, the aircraft is a passenger aircraft. In other embodiments, the aircraft is a freight aircraft.

In some embodiments, the method 500 further includes the step of transmitting, via a computer communication, the identification number to at least one organization that replaces or tracks one or more assets associated with the aircraft. In an example, the at least one organization comprises a maintenance, repair and overhaul (MRO) provider, and the one or more assets comprise an engine of the aircraft, a pressurization system of the aircraft, a landing gear of the aircraft, one or more stabilizers of the aircraft or a hydraulic system of the aircraft. In another example, the at least one organization comprises a third-party broker, and the one or more assets comprise one or more parts of the aircraft. In yet another example, the at least one organization comprises a developer of applications and services for the aircraft, and the one or more assets comprise software modules created by the developer.

Figure 6:
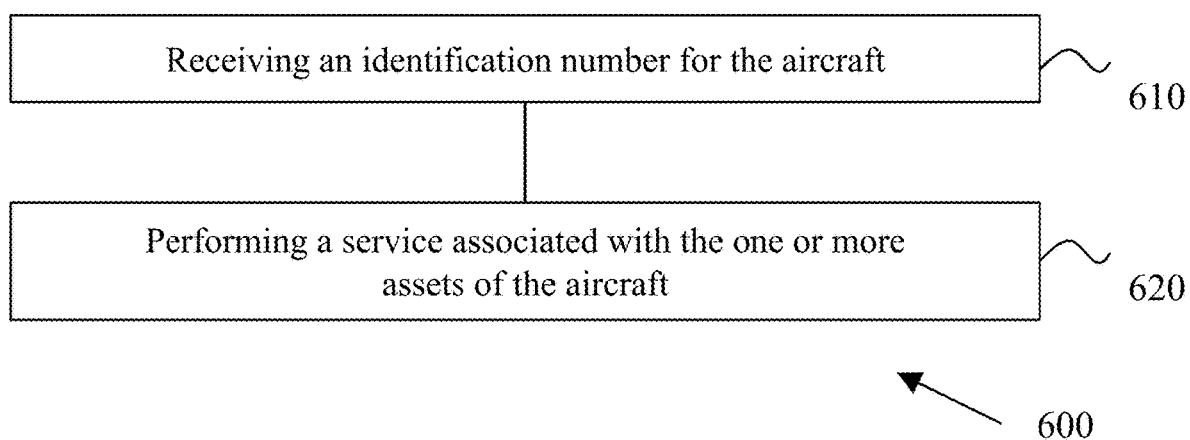
FIG. 6 shows a flowchart of another example method for aircraft identification, in accordance with embodiments of the disclosed technology.

FIG. 6 shows a flowchart of an example method 600 for aircraft identification, in accordance with embodiments of the disclosed technology. The method 600 includes, at step 610, receiving an identification number for the aircraft. The method 600 includes, at step 620, performing a service associated with the one or more assets of the aircraft. In some embodiments, the identification number is generated as described in method 500.

In some embodiments, the service comprises maintenance and repair by a maintenance, repair and overhaul (MRO) provider, and the one or more assets comprise an engine of the aircraft, a pressurization system of the aircraft, a landing gear of the aircraft, one or more stabilizers of the aircraft or a hydraulic system of the aircraft.

In some embodiments, the service comprises third-party acquisitions and dispositions, and the one or more assets comprise one or more parts of the aircraft.

In some embodiments, the service comprises developing an application for the aircraft, and the one or more assets comprise software modules created by a developer.

Figure 7:
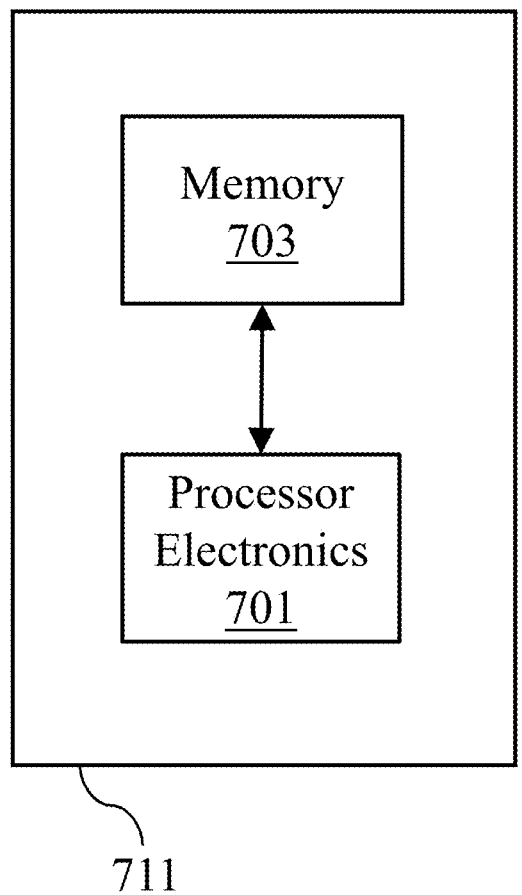
FIG. 7 shows a block diagram of an example device that can implement embodiments of the disclosed technology.

FIG. 7 is a block diagram representation of a portion of a device, in accordance with some embodiments of the presently disclosed technology. A device 711 can include processor electronics 701 such as a microprocessor that implements one or more of the techniques presented in this document, including generating the alphanumeric prefix, the modified serial number and/or the identification number. Device 711 can include one or more memories 703 configured to store information such as data and/or instructions. In some embodiments, at least some of the disclosed techniques, modules or functions are implemented using the device 711.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A computer-implemented method for identifying an aircraft, comprising:
generating, based on a manufacturer, a model and a series of the aircraft, an alphanumeric prefix that uniquely identifies the model and the series of the aircraft from the manufacturer using a first computer-implemented technique;
generating, from a manufacturer serial number that is assigned to an airframe of the aircraft, a modified serial number using a second computer-implemented technique;
generating, based on concatenating the alphanumeric prefix and the modified serial number, an identification number for the aircraft using a third computer-implemented technique; and
assigning the identification number to a transponder of the aircraft,
wherein the identification number is provided through a data feed or an application programming interface (API) to at least one organization that replaces or tracks one or more assets associated with the aircraft, and
wherein the identification number is configured to integrate with location-aware services and improve safety of the aircraft.

2. The method of claim 1, wherein the identification number is associated with the airframe of the aircraft and remains unchanged and unique over a service life of the aircraft.

3. The method of claim 1, wherein the second computer-implemented technique comprises generating the modified serial number by parsing the manufacturer serial number and removing non-alphanumeric characters from the manufacturer serial number.

4. The method of claim 1, further comprising:
associating, using the identification number, the airframe of the aircraft with at least one software installed on the aircraft.

5. The method of claim 1, further comprising:
associating, using the identification number, the airframe of the aircraft with at least one hardware component installed on the aircraft.

6. The method of claim 1, further comprising:
adding a prefix "P" to the concatenation of the alphanumeric prefix and the modified serial number to indicate that a manufacture of the aircraft has not been completed.

7. The method of claim 1, wherein the aircraft is a passenger aircraft.

8. The method of claim 1, wherein the aircraft is a freight aircraft.

9. The method of claim 1, wherein the at least one organization comprises a maintenance, repair and overhaul (MRO) provider, and wherein the one or more assets comprise an engine of the aircraft, a pressurization system of the aircraft, a landing gear of the aircraft, one or more stabilizers of the aircraft or a hydraulic system of the aircraft.

10. The method of claim 1, wherein the at least one organization comprises a third-party broker, and wherein the one or more assets comprise one or more parts of the aircraft.

11. The method of claim 1, wherein the at least one organization comprises a developer of applications and services for the aircraft, and wherein the one or more assets comprise software modules created by the developer.

12. An apparatus for identifying an aircraft, comprising:
a processor; and
a non-transitory memory with instructions thereon, wherein the instructions upon execution by the processor cause the processor to:
generate, based on a manufacturer, a model and a series of the aircraft, an alphanumeric prefix that uniquely identifies the model and the series of the aircraft from the manufacturer using a first computer-implemented technique;
generate, from a manufacturer serial number that is assigned to an airframe of the aircraft upon its manufacture, a modified serial number using a second computer-implemented technique;
generate, based on concatenating the alphanumeric prefix and the modified serial number, an identification number for the aircraft using a third computer-implemented technique; and
assign the identification number to a transponder of the aircraft,
wherein the identification number is provided through a data feed or an application programming interface (API) to at least one organization that replaces or tracks one or more assets associated with the aircraft, and
wherein the identification number is configured to integrate with location-aware services and improve safety of the aircraft.

13. The apparatus of claim 12, wherein the identification number is associated with the airframe of the aircraft and remains unchanged and unique over a service life of the aircraft.

14. The apparatus of claim 13, wherein the second computer-implemented technique comprises generating the modified serial number by parsing the manufacturer serial number and removing non-alphanumeric characters from the manufacturer serial number.

15. The apparatus of claim 12, wherein the aircraft is a passenger aircraft or a freight aircraft.

16. The apparatus of claim 12, wherein the instructions upon execution by the processor further cause the processor to:
associate, using the identification number, the airframe of the aircraft with at least one software or at least one hardware component installed on the aircraft.

17. A computer program product stored on a non-transitory computer readable media, the computer program product including program code for carrying out a method for identifying an aircraft, the method comprising:
generating, based on a manufacturer, a model and a series of the aircraft, an alphanumeric prefix that uniquely identifies the model and the series of the aircraft from the manufacturer using a first computer-implemented technique;
generating, from a manufacturer serial number that is assigned to an airframe of the aircraft upon its manufacture, a modified serial number using a second computer-implemented technique, wherein the modified serial number excludes hyphens and special characters; and generating, based on concatenating the alphanumeric prefix and the modified serial number, an identification number for the aircraft using a third computer-implemented technique; and assigning the identification number to a transponder of the aircraft, wherein the identification number is provided through a data feed or an application programming interface (API) to at least one organization that replaces or tracks one or more assets associated with the aircraft, and wherein the identification number is configured to integrate with location-aware services and improve safety of the aircraft.

18. The computer program product of claim 17, wherein the identification number is associated with the airframe of the aircraft and remains unchanged and unique over a service life of the aircraft.

19. The computer program product of claim 17, wherein the method further comprises:

associating, using the identification number, the airframe of the aircraft with at least one software installed on the aircraft.

20. The computer program product of claim 17, wherein the aircraft is a passenger aircraft or a freight aircraft.

* * * * *